Feb. 23, 1943. W. G. SMITH Re. 22,277

INDICATING DEVICE

Original Filed June 4, 1936 5 Sheets-Sheet 1

INVENTOR.
W. Graydon Smith,
BY
Ben J. Chromy Jr. ATTORNEY.

Feb. 23, 1943. W. G. SMITH Re. 22,277

INDICATING DEVICE

Original Filed June 4, 1936 5 Sheets-Sheet 2

INVENTOR.
W. Graydon Smith,
BY
Ben J. Chromy
ATTORNEY.

Feb. 23, 1943. W. G. SMITH Re. 22,277

INDICATING DEVICE

Original Filed June 4, 1936 5 Sheets-Sheet 3

INVENTOR.
W. Graydon Smith,
BY
Ben J. Chaney
ATTORNEY.

Feb. 23, 1943. W. G. SMITH Re. 22,277
INDICATING DEVICE
Original Filed June 4, 1936 5 Sheets-Sheet 4
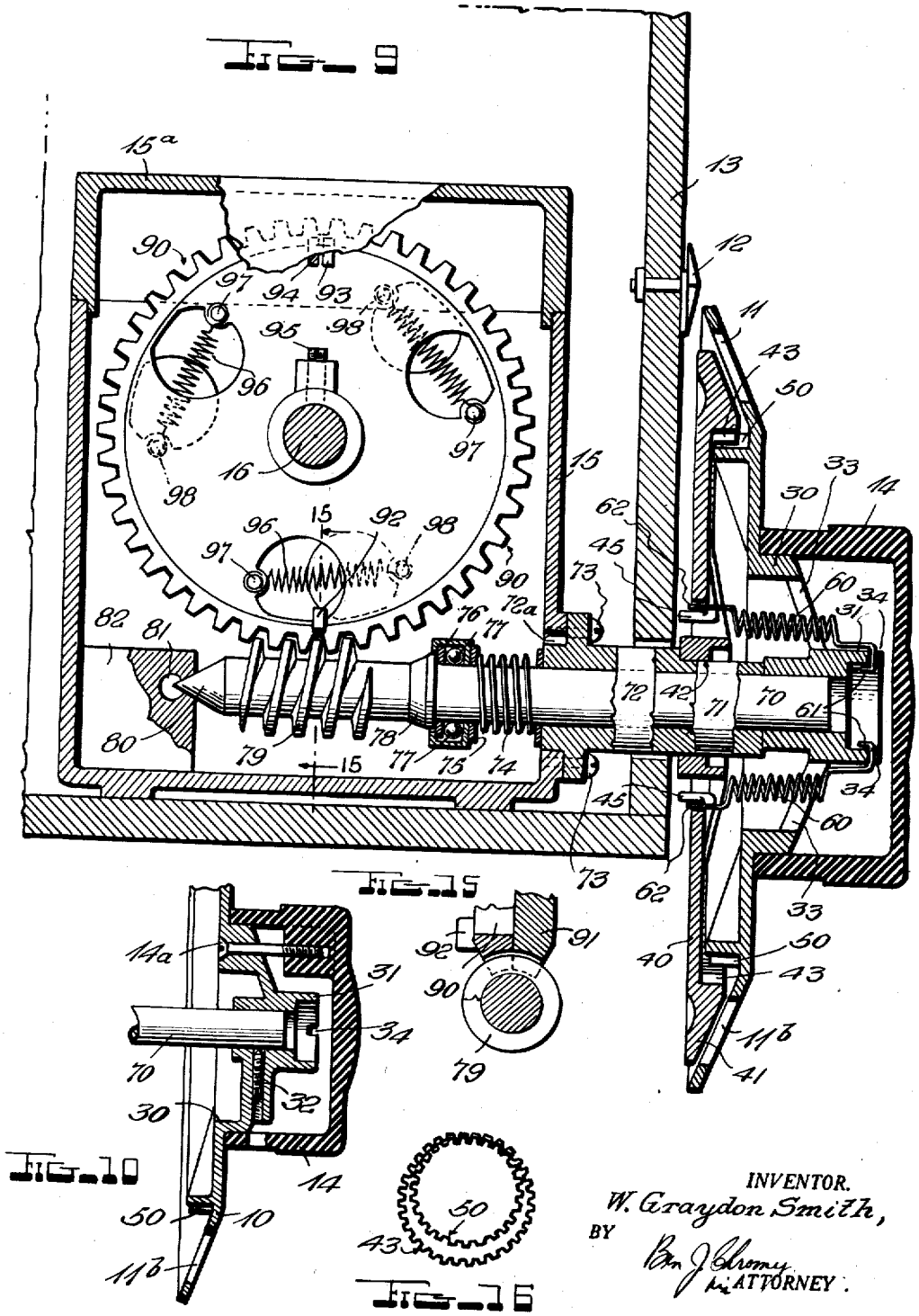
INVENTOR.
W. Graydon Smith,
BY
Ben J. Chromy
ATTORNEY.

Feb. 23, 1943. W. G. SMITH Re. 22,277

INDICATING DEVICE

Original Filed June 4, 1936 5 Sheets-Sheet 5

INVENTOR.
W. Graydon Smith,
BY
by Geo. J. Cheney
ATTORNEY.

Reissued Feb. 23, 1943 Re. 22,277

UNITED STATES PATENT OFFICE 22,277

INDICATING DEVICE

William Graydon Smith, Concord, Mass., assignor to National Company, Inc., Malden, Mass., a corporation of Massachusetts Original No. 2,060,537, dated November 10, 1936, Serial No. 83,579, June 4, 1936. Application for reissue August 1, 1942, Serial No. 453,235

11 Claims. (Cl. 116—124.3)

Figure 1:
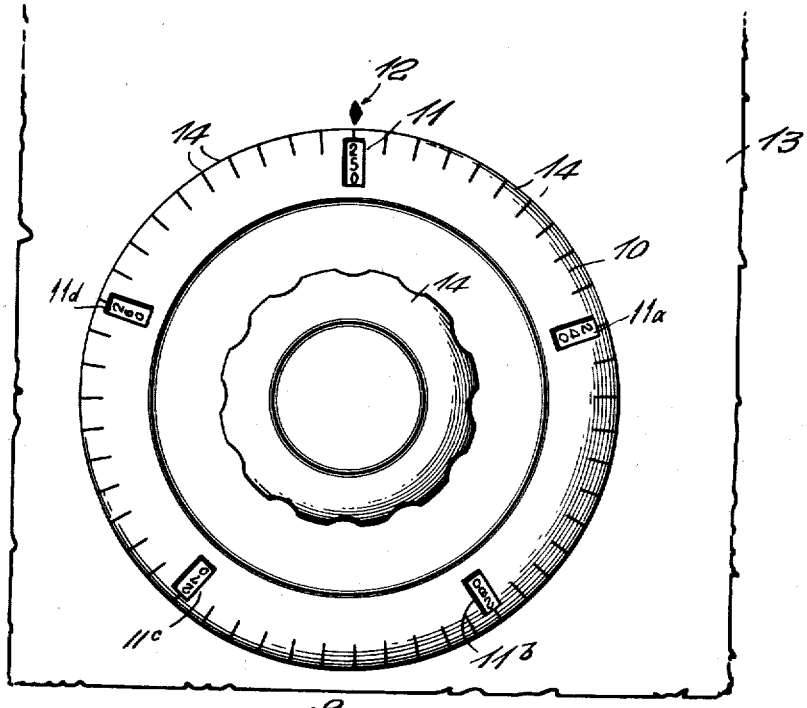

This invention relates to indicating devices generally. More particularly this invention relates to a dial and/or similar mechanism adapted to be used as a micrometer caliper, radio tuning control and the like, where a relatively accurate reading is desired.

An object of this invention is to provide a simple indicating mechanism employing a pair of calibrated disc-like members angularly movable with respect to each other at substantially the same peripheral velocity, and being arranged so that one of the disc-like members is positioned behind the other so that the graduations of the rear member may be viewed through small windows provided in the front member as said members are rotated.

Another object of this invention is to provide a simple mechanism employing a pair of disc-like graduated or numbered members which are adapted to be movable angularly at least to a slight extent with respect to each other to indicate accurately the number of revolutions through which a shaft, on which said disc-like members are mounted, is rotated.

Another object of this invention is to provide a dialing device adapted to be mounted on or associated with a shaft to be rotated for rotating said shaft through relatively small angles and for indicating the rotation of said shaft by means of sets of pre-arranged numbers and indicators carried by indicator elements movable with respect to each other to a predetermined extent as said shaft is rotated.

A further object of this invention is to provide an adjusting and indicating mechanism adapted to rotate a shaft and indicate accurately the extent to which said shaft was rotated in the clockwise or counterclockwise direction.

Other and further objects of this invention will be apparent to those skilled in the art to which it relates from the following specification and claims.

In accordance with this invention I provide an indicating device of simple and efficient construction adapted to be used simply as a measuring device, or as a computing device for combining readings on one dial and pointer device heretofore obtained from two or more dial and pointer devices, or as an accurate dial control device adapted to indicate the extent of rotation of a shaft. I have illustrated and described several embodiments of the indicator arrangement of my invention, all of which will be more clearly understood from the following specification.

The indicator device set forth herein includes two rotatable or movable members which cooperate to produce the correct indication of the shaft being rotated. The shaft being rotated is either attached to one of the movable members or geared thereto and rotation of the shaft transmits motion either through the latter member or through suitable gear or gears to the other of said rotatable or movable members. These two members are provided with graduations and/or scales which are shifted in a predetermined manner with respect to each other, through the operation of the rotated shaft or through the operation of one of the members, adapted to rotate said shaft, and the extent through which the shaft is rotated or the revolutions imparted thereto, are indicated or may be easily determined from said graduations and/or scales. One of the rotatable members is positioned in front of the other and is provided with a series of small windows through which successive parts of the scales or graduations of the rear rotatable member are brought into view.

The preferred embodiment of my invention employs two disc-like members, each provided with gear teeth. The gear teeth of one of these disc-like members are adapted to mesh with the teeth of the other member. Rotation of one member, therefore, causes the other to rotate also. However, these members, being eccentrically mounted with respect to each other and having an unlike number of teeth, do not rotate at the same angular velocity although the peripheral velocities of the aforesaid small windows of the front rotatable member and the scales or graduations of the rear rotatable members are the same. The graduations or scales carried by the rear disc-like member are, however, caused to shift in position with respect to the aforesaid windows and indicate the rotation or revolution of the shaft.

One of the embodiments of this invention shows one of the disc-like members provided with a knob and fastened to a shaft for the purpose of rotating this shaft and a reduction gear arrangement. This embodiment of the invention is particularly adapted to be employed for controlling the tuning of signaling apparatus. It is, however, to be understood that this invention is not limited to use with tuning controls and that this illustration of the use thereof is only by way of example.

Figure 2:
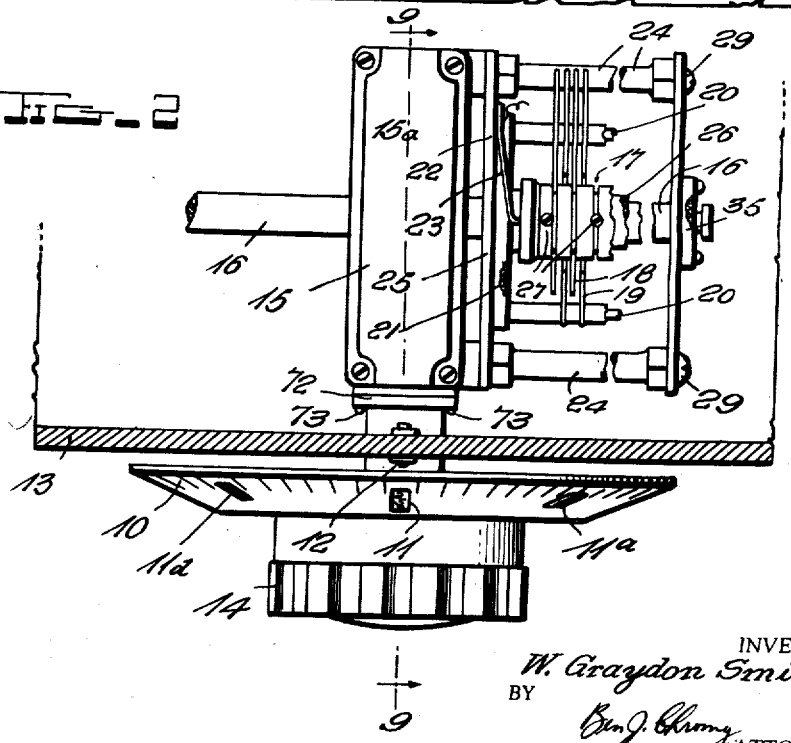
Figure 5:
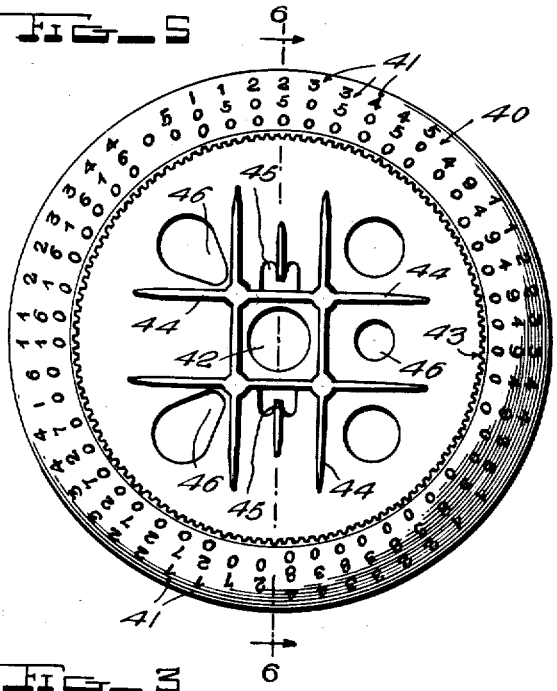
Figure 6:
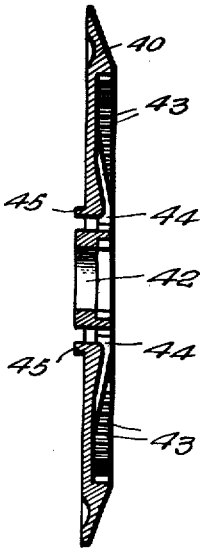
Figure 3:
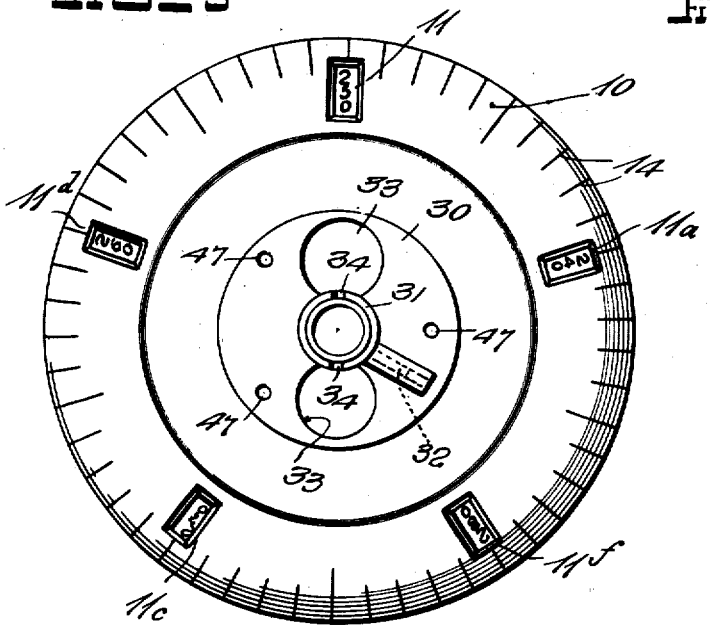
Figure 4:
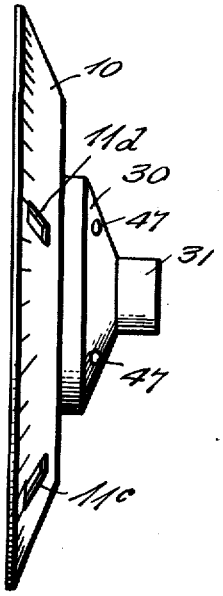
Figure 7:
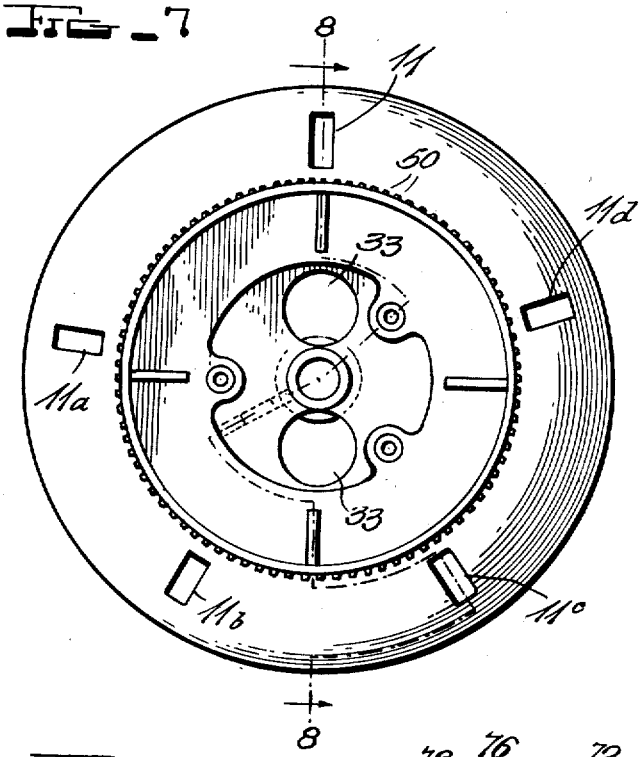
Figure 8:
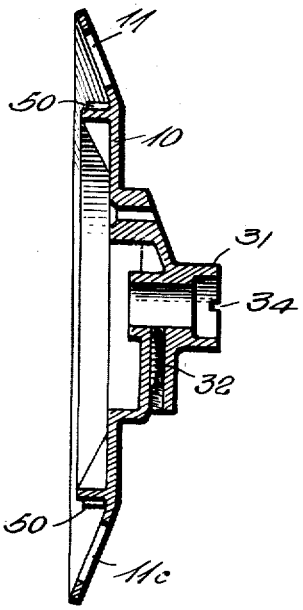
Figure 11:
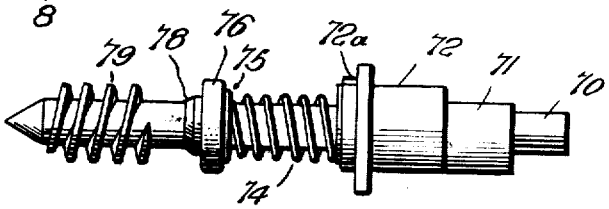
Figure 12:
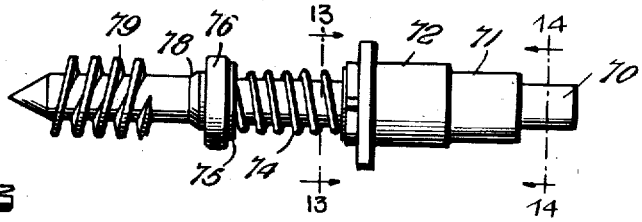
Figure 13:
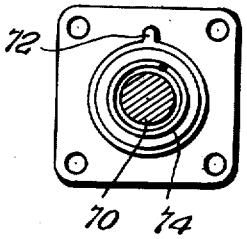
Figure 14:
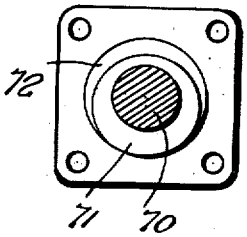
Figure 17:
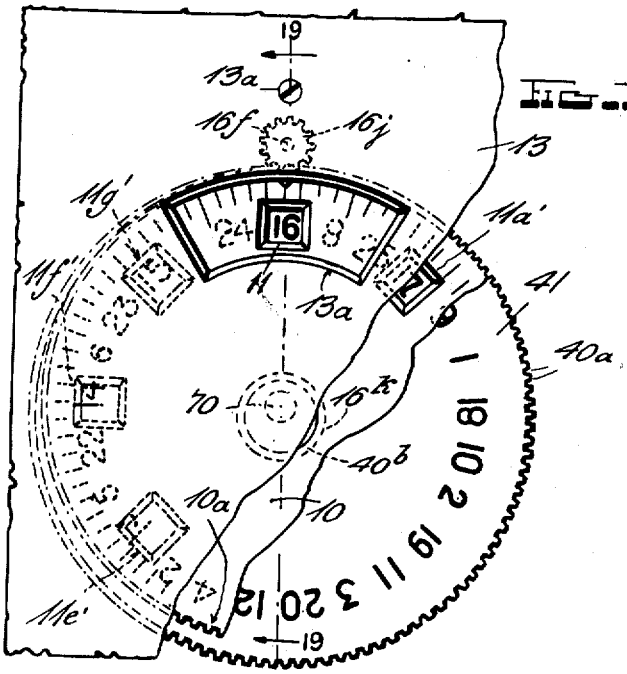
Figure 19:
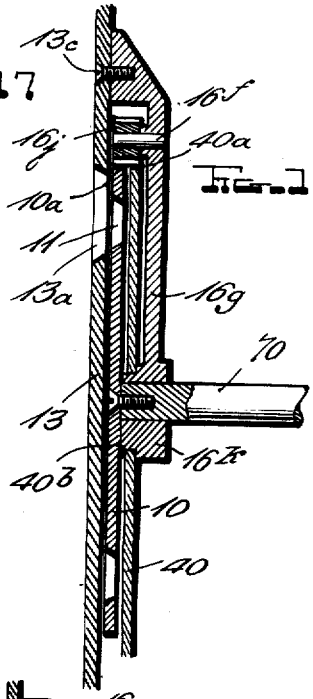
Figure 18:
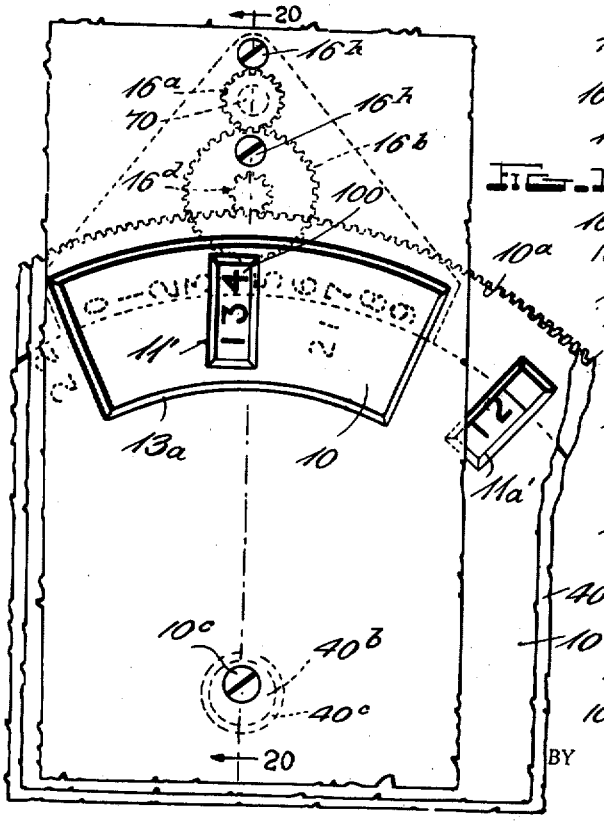
Figure 20:
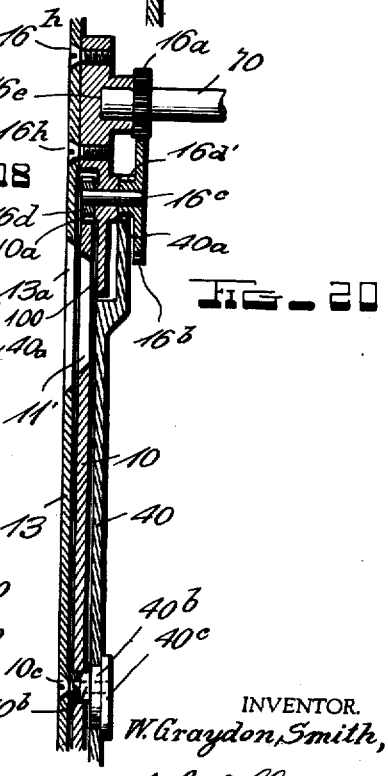

Further details of this invention will be set forth in the specification and the drawings in which, briefly, Figure 1 shows a front view of the indicating and control mechanism; Figure 2 shows a top view of the indicating and tuning control; Figure 3 and 4 are views showing one of the indicator dials in front and side elevation; Figures 5 and 6 show the inner indicating dial in front elevation and cross-section, respectively; Figures 7 and 8 are views illustrating the inner surfaces of the dial shown in Figures 3 and 4; Figure 8 is a sectional view taken along the line 7—7 of Figure 7; Figure 9 is a sectional view taken along the line 9—9 of Figure 2; Figure 10 is a sectional view of the knob employed on the control, showing this knob attached to the front dial; Figures 11 and 12 are views illustrating the worm gear and shaft; Figures 13 and 14 are sectional views along the lines 13—13 and 14—14 of Figure 12, respectively; Figure 15 is a section through the worm gears along the line 15—15 of Fig. 9; Figure 16 is a diagram illustrating the principle of operation; Figures 17 and 18 illustrate modified forms of the dial indicating mechanism of this invention; and Figures 19 and 20 are sectional views along the lines 19—19 and 20—20 of Figures 17 and 18 respectively.

Referring to the drawings in detail, particularly Figure 1, reference numeral 10 designates the front graduated mask or dial having five small holes 11, 11*a*, 11*b*, 11*c*, and 11*d* formed adjacent to the periphery thereof. The periphery of this dial 10 is graduated, and graduations 14, evenly spaced, are engraved, embossed, printed, etched, or otherwise placed upon the beveled surface adjacent to the circumference of the dial. The windows 11, 11*a*, 11*b*, 11*c*, and 11*d* are equally spaced around the dial, ten graduations apart. A pointer 12 is attached to the panel 13 near the top of the dial 10 and forms a pointer or indicator. A knob 14 is screwed, bolted, or otherwise attached to this dial to facilitate rotation thereof.

This dial mechanism is placed on the front of the panel 13 and is held there by a shaft and bearing arrangement, described in following paragraphs of this specification. Behind the panel 13 a gear box 15 is positioned. This gear box supports a shaft upon which the devices to be controlled are mounted. For purposes of illustration a tuning condenser 22 is shown mounted on one side of the gear box 15. Several of these units or similar units may be mounted on the shaft 16 to be controlled in accordance with the operation of the dial knob 14, if desired. The condenser in the present case is provided with rotor and stator plates 18 and 19, respectively. The stator plates are held in spaced relation upon the grooved or notched supports 20 the ends of which are attached to insulation supports 21 and 21*a*. An insulation plate or panel 25, to which the support 21 is attached, is bolted to the side of the gear housing 15 by means of the members 24, the threaded ends of which extend into threaded holes formed in the side of the gear housing, through suitable holes formed in the insulation member 25. The rotor plates 18 are held in a hollow-grooved-cylindrical support 17, properly spaced. One end of this supporting member 17 is engaged by a wiping resilient contact member 23 for the purpose of forming electrical contact with the rotor plates through this support. A suitable sleeve 26 is positioned over the shaft 16 and supports the member 17 on the shaft electrically insulated therefrom. The sleeve may be of any suitable insulation material, such as, fiber, Bakelite, hard rubber, and the like, which is somewhat deformable. The set screws 27 are provided to threaded holes in the support 17 for the purpose of fastening this tubular support over the insulation sleeve 26 and the shaft 16. A substantially rigid end plate 28 is attached to the ends of the members 24 by suitable bolts 29. An insulation bearing member 35 is supported in the end plate 28 in engagement with the end of the shaft 16. This insulation bearing carries a ball bearing inside thereof and is provided with a screw adjustment for thrusting said ball bearing against the end of said shaft. A piece of insulation material similar to the insulator 21, made of material such as synthetic porcelain, porcelain, glass, boro-silicate glass, fused quartz, or the like, having good insulating properties for relatively high frequency electric currents, is attached to the ends of the stator supports 20 and to the end plate 28 to provide additional supporting means for the said stator plates. One or more variable electrical condenser units such as, the condenser 22, may be mounted on each side of the gear box 15, in a tandem arrangement, if desired. However, if only one unit is to be used, then the shaft 16, shown extending to the left of the gear housing 15 is cut off adjacent to said housing.

The dial 10 and the dial 40, which is positioned inside of the dial 10, are illustrated in detail in Figures 3, 4, 5, and 6. These dials are assembled and held together by two small springs 60, shown in Figure 9. The dial 10 is provided with a centrally-located shaft-receiving section 31, the forward end of which is provided with two small notches 34 which receive the hooks 61 of the springs 60. These springs are passed through the holes 33 formed in the section 35 and the hooks 62, formed at the other ends of the springs, brought into engagement with the small projections 45 formed in the disc 40, as shown in Figures 5, 6, and 9. When the disc-like dials 10 and 40 are assembled, the notches 34 and the projections 45 must be in alignment and the number 250 must appear visible through the window or hole 11, as will be described in more detail further in the specification.

The central portion of the disc 40 is provided with 3 holes 46. Portions of these holes are in alignment with the holes 47 provided to the disc-like dial 10. These holes are made to provide access to and receive small bolts which are used to attach the knob 14 to the front dial 10 as illustrated in more detail in Figure 10. A set screw 32 is provided to the dial 10 for the purpose of attaching this dial to the shaft 70, shown in Figures 9, 11, and 12.

A ring-like gear 50 is provided to the inside of the dial 10 as shown in Figures 7 and 8. This gear is made to mesh with the gear 43 of the dial 40, when the two dials are assembled as in Figure 9.

After the two dials are assembled and held together by the spring 60 as aforesaid, the dial assembly is placed over the end of the shaft 70 and the hole 42 of the dial is placed over the eccentrically disposed section 71 of the bearing member 72. This bearing member is attached to the gear casing 15 by small bolts 73 and projects outward from the front side of this gear casing. A spring 74 abuts against the inner surface of the bearing 72 and also against the bearing washer 75 which is positioned adjacent to the ball bearing housing 76. The housing 76 encloses and forms a race for ball bearings 77 and abuts against the shoulder 78 formed on the shaft 70. The worm 79 is formed integral with the shaft and made to mesh with the worm wheels 90 and 91, as shown in Figs. 9 and 15. The end 80 of the shaft 70 is pointed and extends into the hole 81 of a thrust bearing, formed in the projection 82 on the inside of the housing 15. This hole forms a bearing surface for the shaft 70, serving to keep the worm gears in mesh, and the inner portion thereof may be made larger than the shaft point to permit grease to be packed therein.

When the worm gear 79 is placed in the housing 15 in mesh with the worm wheel 90, the bearing member 72 must be pressed into engagement with the side of the housing 15 in such a way that the lug or projection 72a fits into a slot 72b formed in the wall of said housing. When this lug 72a is received in the slot 72b the section 71 which is eccentrically disposed with respect to the shaft 70 assumed its proper position with respect to said shaft. This is the same position as the shaft hole of the dial 10 and the hole 42 of the dial 40 have with respect to each other when the scale number 250 is visible through the hole 11, as shown in Fig. 1. The number 250 is one of the scale numbers on the scale 41 of dial 40, Fig. 5.

The relation of the shaft 70 and the section 71, which is eccentrically disposed with respect to this shaft, is shown in more detail in Figure 14, which is a cross-section taken along the line 14—14 of Figure 12. The dial 10 is attached to the shaft 70 adjacent to the section 71, by means of the set screw 32 and is adapted to rotate this shaft when the knob 14, attached to the dial, is rotated. The dial 40, which is positioned substantially inside of the dial 10, fits over the section 71, rather snugly, and when the dial 10 and shaft 70 are rotated, this eccentrically disposed section 71 causes the dial 40 to oscillate with respect to the dial 10. This causes an angular displacement or a slight rotation to take place between the dials 10 and 40 through the operation of the gears 50 and 43.

The worm wheels 90 and 91 associated with the worm 79 are mounted inside of the housing 15 on the shaft 16 which extends through the housing and is mounted in bearings formed in the sides of the latter. The worm wheel 90 is provided with two lugs 92 and 93 which cooperate with a similar lug 94 formed in the inside of the top 15a, to limit the rotation of this worm wheel 90 substantially to one-half revolution thereof. The purpose of this will be more fully explained in the operation of this device. Several springs 96 attached to small lugs 97 provided to the worm wheel 90 are also attached to similar lugs 98 formed on the worm wheel 91. The purpose of these springs is to shift the worm wheels 90 and 91 with respect to each other slightly as these worm wheels are worn through engagement with the worm 79. Thus these springs serve to take up backlash that may otherwise be developed through the wearing of the worm gears after a certain period of normal use. These springs are adjusted to exert a slightly shearing action upon the teeth of the worm 79, that is, the teeth of the worm wheels 90 and 91 tend to shear the teeth of the worm 79 to a slight extent. This shearing action must not be made too great, otherwise undue wear will be placed upon the teeth of the worm gears.

The gear housing 15 is provided with a cover 15a, attached in any convenient manner, as by suitable bolts, to the body of the housing. When it is desired to gain access to the gears 90 and 91, this cover 15a may be removed. The gear 90 is fastened to the shaft 16 by means of one or more set screws 95. The gear 91 is not attached to the shaft 16 by set screws or otherwise except through the springs 96 and the gear 90. The shaft 16 may be removed from the housing 15 by loosening the set screw 95 and by loosening the set screws 26 of the condenser 22 shown in Figure 2. The housing 15 is preferably packed with grease to a slight extent so that the worm gears and the bearings of the shaft 70 are properly lubricated to reduce wear to a minimum.

Referring now particularly to Figs. 3 and 5, I shall describe the manner in which the dials are marked in the example shown and the resultant operation. In the example this marking is in accordance with the decimal system of numerical notation and the movement of the condenser from one extreme to the other of its finite range is arbitrarily divided into 500 parts which are effected by ten revolutions of the shaft 70 (Fig. 9), that is, ten manual revolutions of the knob 14. Thus each revolution of the shaft represents a simple fraction, one-tenth, of the range of the instrument. It will be noted that this range is a non-recurrent range and there are thus five hundred and one designated positions of adjustment with an end point 0 at one extreme of the range and an end point 500 at the other. Having reached, say, the point 500 to commence a new traverse from zero, we must first retrace our steps thereto backwardly throughout the range. Each revolution of the shaft, corresponding to one revolution of the dial 10, effects a movement through fifty points in the range and therefore the dial 10 may have fifty peripheral graduations 14, each one of which may be brought into opposition to the stationary index or orienting point 12 (Fig. 1) exactly to determine the position of the mechanism being adjusted. To designate cardinal points in the range, herein every multiple of ten, the inner dial 40 (Fig. 5) is suitably inscribed with numerals expressive of such multiples, which numerals are in operation selectively exposed through the apertures 11 and as regards the aperture which in operation is moving past the index 12 expresses the number of increments of motion which have been impressed upon the mechanism, as will hereinafter appear. For this purpose five apertures 11 equally spaced circumferentially are provided and, as seen in Fig. 5, in adjacent circumferential segments of the bevelled periphery of the dial 40 five series of numerals. Each series forms an arithmetical progression, the common difference in each of the progressions being fifty, and the initial terms of the progressions, proceeding herein in a positive direction of rotation or counterclockwise, as 0, 10, 20, etc., in themselves form an arithmetical progression.

At the upper portion of Fig. 5 will be noted the numeral 0 and the numeral 500 indicative of the end points of the movement, one or the other of which might be considered a supernumerary number. In other words, we have fifty-one numerals, multiples of ten, expressing cardinal points of the range of five hundred positions including the two end points.

It will be understood that the gear ratio is such that, if we start initially at the indication 0, ten revolutions of the shaft corresponding to the complete range of the instrument will bring the numeral 500 to the same position, the relative movement of dial 40 with respect to dial 10 being less than one full revolution. At intermediate points successive revolutions of the shaft will bring to substantially the same position homologous elements of the several sets of numerals. For instance, if we start at 250, as shown in Fig. 5, which may be considered the sixth element of the arithmetical progression which begins with 0 and has the common difference fifty, one-fifth of a revolution will bring to substantially the 12 o'clock position shown the numeral 260, which is the sixth element of the progression beginning with 10, two-fifths of a revolution will bring to the 12 o'clock position the numeral 270, the sixth element of the series beginning with 20. The complete revolution starts a new cycle with 300, the seventh element of the first series.

Now, with the parts in the position shown in Fig. 3, let us suppose that we wish to adjust the mechanism to the position designated by the numeral 256. We turn the knob clockwise. The outer dial 10 rotates and, the peripheral speed of the two dials being substantially the same at the 12 o'clock position, the whole system with the inscriptions exposed through the apertures which are within the view of the operator appears to move as a unit and we turn the dial to the sixth graduation to the left in customary manner. The effect, particularly because the lower apertures, past which the numerals would be seen moving rapidly, are concealed from the normal vision of the operator by the knob and the operator's hand which grasps the knob and the fact that they are on the downwardly facing bevelled edge of the dial and thus not presented to the eye, is that of turning a simple dial inscribed with fifty graduations, every tenth graduation being numbered. However, if we wish to pass to 495, corresponding to 245 units of adjustment, we would rapidly twirl the dial in our fingers. By virtue of the construction described the inscriptions in the windows coming up from the left would appear as stationary inscriptions numbered with multiples of ten and by this quick and rapid movement we would reach 490 and then by a slower movement move the desired graduation 14 indicative of five units into opposition to the index 12. The operation would stop at the extreme point 500 or at the extreme point 0 in the other direction.

We are working with a dial marked with fifty widely spaced graduations but which is always in effect inscribed with numerals expressive of the particular group of 50 in the range of 500 in which we are operating. The practical effect is as if our dial had five hundred and one similarly spaced graduations. Expressed otherwise, if our dial is five inches in diameter, our scale of five hundred units is about thirteen feet long. Because of the eccentric relation of the parts the linear speed of the numerals and the apertures is substantially identical at the upper part of the dial, and while a number moves across an aperture on each revolution of the shaft 70 the motion may be said to be practically imperceptible to the eye in the upper quadrant, say from the 10:30 o'clock to the 1:30 o'clock position, and is indeed hardly noticeable throughout the upper half of the circumference.

It is, of course, obvious that different calibrations of these dials may be employed in accordance with this invention. For example, a greater or lesser number of holes may be employed in the dial 10 and different graduations and scales may be employed on the dial 40. I have shown two variations of this dial employing different calibrations and different scale arrangements, in Figures 17, 18, 19, and 20. Corresponding parts of these figures are designated by the same reference numerals as employed in the previous figures. In these embodiments of this invention the dials 10 and 40 are mounted behind the panel 13 and are driven from the shaft 70. No knob for rotating the dials is shown on the front of the panel although it is obvious from the showing in the previous figures that this may be provided, if desired. At the same time the dials may be driven from the shaft of the electrical instrument with which they are associated and the electrical instrument may be controlled by other than manual controls.

The dial 10 is attached to the end of the shaft 70 by means of a suitable bolt 10*c* fitted into said shaft. A small gear adapted to mesh with the peripheral gear teeth of the dials 10 and 40 is mounted upon the pin 16*f* which is carried by the arm 16*g*. This arm is attached to the panel by means of a suitable bolt 13*c* and extends to the shaft 70.

The section 16*k* of the arm 16*g* corresponds to the member 72 shown in Figures 11 and 12. This section 16*k* is provided with a section 40*b* which is eccentrically disposed with respect to the shaft 70 in substantially the same manner as the section 71 is eccentrically disposed with respect to the shaft 70 of Figures 11 and 12. The dial 40 is supported on the section 40*b* which forms its bearing.

An elongated window 13*a* is formed in the panel 13 permitting the scale of the dial 40 and the holes 11, 11*a*, 11′, 11*a*′., 11*e*′, 11*f*′, and 11*g*′ of the dial 10 to be viewed as these dials are rotated through the operation of the shaft 70 and the pinion gear 16*j*.

In this form of the invention the dial 10 is smaller than the dial 40 and rotates faster than the dial 40 inasmuch as these dials are rotated by gear teeth formed in their peripheries. The dial 40 is also provided with a scale 41 comprising a series of numbers, including the numbers 1 to 25. The numbers 1 and 2 are spaced ten divisions apart, are are all of the succeeding consecutive numbers up to and including the number 25. The dial 10, in this case, is provided with eight holes such as the hole 11′. These holes permit the numbers from the scale of the dial 40 to be brought into view in their consecutive order; for example, if the number 1 is visible in the hole 11, the next number that will be visible in the succeeding hole, as the dials are rotated, will be number 2 and so on, until the number 25 is rendered visible at the top of the dials through the elongated hole 13*a*.

The principle of operation of this embodiment is the same as that of the embodiment previously described.

The embodiment of this invention shown in Figures 18 and 20 differs from that shown in Figures 17 and 19 in that the shaft 70 is provided with a small pinion gear 16*a* engaging the gear 16*b* which is mounted upon the pin 16*c* and drives the small pinions 16*d* and 16*d*′. These small pinions 16*d* and 16*d*′ engage the peripheral gears 10*a* and 40*a* of the dials 10 and 40 respectively. These dials 10 and 40 are also eccentrically mounted with respect to each other, the member 40*c* being provided for this purpose. This member 40*c* is attached to the panel 13 by means of the small bolt 10*c* and is provided with two bearing surfaces 10*b* and 40*b* which engage the dials 10 and 40 respectively. The bearing surface 40*b* is eccentrically disposed with respect to the bearing surface 10*b*. An auxiliary scale 100, partially visible through the hole 13*a* in the panel 13 and the hole 11′ of the dial 10, is employed in this embodiment in place of the graduations 14 on dial 10, Figure 3.

The operation of the embodiment of this invention shown in Figures 18 and 20 is similar to that of the other embodiments of this invention. In this case, however, the hole 11′ passes over the graduations or scale 100 as the dial 10 is rotated. For example, when this dial 10 is rotated in the clockwise direction and the number 13 on the dial 40 is visible through the hole 11′, the reading shown through this hole 11′, as this hole is brought into view in the window 13*a*, will be 130 near left end of said window and increase in steps of one to 131, 132, 133, 134, and so on up to 139, as the hole 11′ passes out of view under the panel 13 at the right end of said window. The next hole to the left of the hole 11′ will then come in view and exihibit the number 140 at the left end of the window 13*a*. As the dial is rotated further in the clockwise direction, the reading increases to 149 and the next hole is brought into view at the left end of the window 13*a* giving the reading 150 and so on.

It is obvious that the embodiments of this invention shown in Figures 17, 18, 19, and 20 may be employed in conjunction with the embodiment of this invention shown in Figures 2 and 9, with other than manual controls shown therein. Different forms of drive mechanisms may be employed for driving or imparting angular motion to the dial or indicator devices.

While I have described my invention in detail with respect to the embodiments set forth herein, it is, of course, understood that modifications thereof may be made without departing from the spirit and scope of this invention. I therefore do not desire to limit this invention to the exact details described and shown except insofar as those details may be defined by the following claims.

What I claim and desire to secure by Letters Patent of the United States is as follows:

1. In means for delicately adjusting a member back and forth over a non-recurrent range, in combination with a driving means, a rotatable shaft moving therewith and making a whole number of revolutions in covering said range, a dial carried by the shaft having graduations corresponding to simple fractions of a revolution for cooperation with an index to determine the adjustment of the member, the dial also having apertures therein, and a second dial masked by the first but observable through said apertures and having thereon a scale comprising sets of numerals, each of which forms an arithmetical progression, the common difference being the same in the several progressions, the first elements of the sets in themselves forming an arithmetical progression, the scale including separate numerals corresponding to the end points of the range of said member, the two dials being geared together to expose homologous numerals of successive groups at one of said openings on successive revolutions of the shaft.

2. In means for effecting a delicate adjustment of a mechanism, a driving shaft geared thereto for effecting a relatively slow movement of the mechanism and manually operable means for turning the shaft, one revolution of the shaft corresponding to a simple fraction of a determined movement of the mechanism, a dial moving with the shaft having graduations corresponding to a simple fraction of the first fraction to be brought into opposition to an index to determine the adjustment of the member, said fractions representing sub-units of a system of numerical notation, the dial also having apertures therein, and a second dial masked by the first but observable through said apertures and having thereon a scale comprising sets of numerals, each of which forms an arithmetical progression, the common difference being the same in the several progressions, the first elements of the sets in themselves forming an arithmetical progression, the two dials being geared together to expose homologous numerals of successive groups at one of said openings on successive revolutions of the shaft.

3. In a means for effecting a delicate adjustment of a mechanism, a driving shaft geared thereto for effecting a relatively slow movement of the mechanism, a knob on the shaft for manually turning the same, a circular dial inward of the knob having peripheral graduations adapted to be brought into cooperation with an index to determine the adjustment of the member, said dial having spaced apertures around the periphery thereof, a rotatable dial rearward of the other having numerals expressive of movements corresponding to passages of a multiplicity of said graduations past the index, said dials being geared together to effect a differential rotative movement therebetween to expose a numeral indicative of the actual movement of the first dial at an aperture exposed for view at one side of the knob and the manipulating hand, the dials at that location moving at substantially equal linear velocities during their rotating movements.

4. In a means for effecting a delicate adjustment of a mechanism, a driving shaft geared thereto for effecting a relatively slow movement of the mechanism, means for rotating the same, a rotatable circular dial having a bevelled edge provided with graduations adapted to be brought into cooperation with an index to determine the adjustment of the member and having apertures intersecting the bevelled portion spaced around the periphery, a dial inwardly of the other having a bevelled edge underlying the bevelled edge of the first, the edge of said second dial being inscribed with numerals expressive of movements corresponding to passages of a multiplicity of said graduations past the index, said dials being geared together to effect a differential rotative movement therebetween to expose a numeral indicative of the actual movement of the first dial centered behind one of said apertures, the dials at that location moving at substantially equal linear velocities during their rotating movement, whereby an observer looking down at said aperture will observe little movement of the indication as the dials turn whereas uncentered numerals at the opposite sides of the dials are faced away from his observation on account of the bevel of the edges.

5. In a means for delicately adjusting a member back and forth over a finite range in combination with a driving means, a rotatable shaft moving therewith and making a whole number of revolutions in covering the range, a dial carried by the shaft having graduations for cooperation with an index extending around its circumference in a continuous series, the dial also having equally spaced apertures corresponding to cardinal points in a scale determined by such graduations, and a second dial masked by the first and geared to rotate through a smaller angular distance than the first and having thereon markings arranged for observation in serial order through a selected one of said apertures as the dial is rotated, said markings being expressive of the serial cardinal divisions of the range and being in number one greater than the product of the number of apertures and the number of whole revolutions made by the dial in covering the range, whereby to provide an identification of every cardinal point in said finite range including the end points.

6. In a means for delicately adjusting a member back and forth over a finite range in combination with a driving means, a rotatable shaft moving therewith and making a whole number of revolutions in covering the range, a dial carried by the shaft having graduations for cooperation with an index extending around its circumference in a continuous series, the dial also having equally spaced apertures corresponding to cardinal points in a scale determined by such graduations, and a second dial masked by the first and having thereon markings denoting the serial cardinal divisions of the range, said second dial being geared to the first to rotate through a smaller angular distance and making, as the member is moved through its range, less than one full revolution relatively to the first dial to expose the markings in serial order at a selected one of the apertures.

7. In means for indicating the adjustment of a mechanism, a shaft connected thereto to make a multiplicity of revolutions when the mechanism moves through its range, a dial on the shaft having markings indicative of successive equal fractional rotations thereof, which markings are adapted to be brought into opposition to an orienting point, a second dial having inscriptions designating decimal multiples of said fraction positioned to be moved past said orienting point, and means gearing the dials together to move at different angular speeds but with substantially the same constant linear speed past the orienting point to provide at said point an indication of the position of the parts expressed in terms of such fractional revolution in units and multiples thereof.

8. In means for indicating the adjustment of a mechanism, a shaft connected thereto to make a multiplicity of revolutions when the mechanism moves through ts range, a dial on the shaft having markings indicative of successive equal fractional rotations thereof, which markings are adapted to be brought into opposition to an orienting point and having spaced apertures adjacent such markings, a second dial behind the first having inscriptions thereon designating decimal multiples of such fraction, said inscriptions being in circumferentially adjacent groups, each group constituting an arithmetical progression, the indications positioned to move past said apertures, and means gearing the dials together to move with different angular speeds but at substantially the same linear speed at the orienting point, whereby the markings and inscriptions cooperate to give an indication at that point.

9. An indicating device comprising a pair of scale carrying members, means for rotating said members with respect to each other, one of said members being disposed in front of and substantially completely masking the other, means in the front one of said members for permitting the viewing of selected portions of the scale of the other of said members, said last mentioned scale comprising numerical designations so arranged that succeeding elements thereof brought into view during the movement of said members continually indicate the extent of said rotation.

10. A combined indicator and control unit comprising a pair of disc-like dials comprising a first dial and a second dial, said first dial being positioned in front of said second dial, indicia on the first dial for manifesting the incremental angular movements thereof, numerical scales for said second dial, said first dial having means for viewing the scales of said second dial, a rotatable shaft, means for fastening said first dial to said shaft, a bearing member for said second dial disposed eccentrically with respect to said shaft, means for rotating said first dial and said shaft, means for rotatively driving said second dial from said first dial at a different angular velocity for exhibiting different parts of the scales of said second dial through said scale viewing means for indicating the extent of rotation of said shaft, and means for said first mentioned rotatable shaft for driving a variable electrode unit for transmitting the effect of angular motion of said first mentioned shaft to said variable electrical unit.

11. A combined indicator and control unit for variable condensers and like apparatus comprising a disc-like dial, a knob for said dial, a shaft for transmitting motion to the apparatus, means for attaching said dial to said shaft, said dial having a plurality of graduations around the periphery thereof and a plurality of holes equally spaced adjacent to the periphery thereof, a second disc-like dial positioned back of said first mentioned dial, numerical scales for said second dial adapted to be viewed through said holes, means for rotating said second dial as said first dial is rotated at a slightly different angular velocity for bringing different parts of said scales into view in selected ones of said holes for indicating the rotations of said first mentioned dial and shaft, and means for attaching a variable electrical device to said shaft for varying said variable electrical device through a non-recurrent range in accordance with the rotation of said knob.

WILLIAM GRAYDON SMITH.

CERTIFICATE OF CORRECTION.

Reissue No. 22,277. February 23, 1943.

WILLIAM GRAYDON SMITH.

It is hereby certified that error appears in the printed specification of the above numbered patent requiring correction as follows: Page 6, second column, line 35, for "electrode" read --electric--; and that the said Letters Patent should be read with this correction therein that the same may conform to the record of the case in the Patent Office.

Signed and sealed this 13th day of April, A. D. 1943.

Henry Van Arsdale, (Seal) Acting Commissioner of Patents.